R. BRAGG.

GONG-ATTACHMENT FOR ENGINE-HOUSE.

No. 6,831. Reissued Jan. 4, 1876.

Witnesses
Geo. H. Strong.
D. R. Cowl

Inventor
Robert Bragg
per Attys. A. H. Evans & Co.

THE NORRIS PETERS CO., PHOTO-LITHO., WASHINGTON, D. C.

UNITED STATES PATENT OFFICE.

ROBERT BRAGG, OF SAN FRANCISCO, CALIFORNIA.

IMPROVEMENT IN GONG ATTACHMENTS FOR ENGINE-HOUSES.

Specification forming part of Letters Patent No. 165,438, dated July 13, 1875; reissue No. 6,831, dated January 4, 1876; application filed October 9, 1875.

*To all whom it may concern:*

Be it known that I, ROBERT BRAGG, of San Francisco city and county, State of California, have invented a Gong Attachment for Engine-Houses; and I do hereby declare the following description and accompanying drawings are sufficient to enable any person skilled in the art or science to which it most nearly appertains to make and use my said invention without further invention or experiment.

The object of my invention is to provide a device for accumulating upon the force which is given out by the movement of a gong-hammer in striking the gong, so that the accumulated power or force can be transmitted to a place distant from the gong, for the purpose of operating some other piece of mechanism, such as ringing a bell, and releasing horses in engine-houses.

The weight of a gong-hammer being only a few ounces, its momentum or force, even if the entire force of its movement was utilized, would amount to but little in operating a piece of light machinery without some accumulating mechanism, while it requires but a slight interruption of its movement to impair its stroke upon the gong. My invention is principally applicable, however, to fire-engine houses, where it can be used for releasing the horses from their stalls at the very instant of the first stroke of an alarm, and for striking an alarm to awaken the engineer or firemen.

My invention consists in the employment of an arm, which is so situated that at the first stroke of the hammer upon the gong it will also strike this arm, which has attached to it any suitable mechanism, so that the force of the blow will release, through this mechanism, a weight. The falling of this weight will pull a rope, which is connected with the mechanism to be operated, in such a manner that the pull upon it will operate the mechanism.

In order to more fully explain my invention reference is made to the accompanying drawings, in which—

Figure 1:
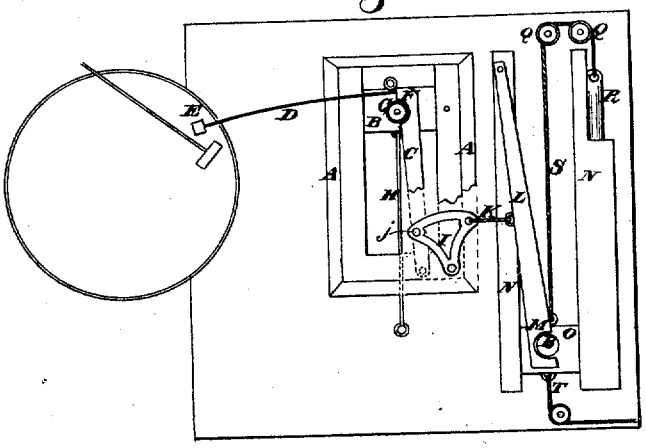
Figure 2:
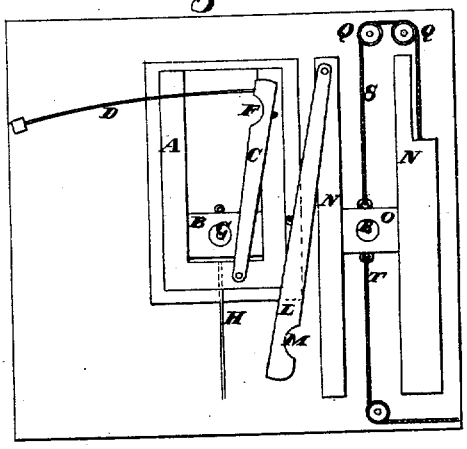

Figure 1 is a view of my attachment ready for an alarm. Fig. 2 is a view of the machine after being set off.

A is a frame or case, within which the weight B slides up and down between suitable guides. An arm, C, is pivoted at the bottom of the frame, and extends up in front of it to a point near the top. From its upper end a rod, D, projects out to one side to such a distance that a knob or pad, E, upon its end will, when the machine is set, be just in front of the gong-hammer, so as to be struck by it when it delivers its first blow. Near the top of the arm C a semicircular recess, F, is made, and a pulley, G, which will just fit into this recess, is pivoted to rotate upon the front of the weight B, so that when the weight B is raised by the rod H or other suitable means, the pulley will run up along the arm C until it falls into the recess F, where it will support the weight until released by the stroke of the gong-hammer. The pulley will relieve the friction so that only the slightest force will be necessary to detach the weight, while the overhanging rod D will always keep the arm C closely against the pulley, ready to allow it to fall into the recess the instant it arrives at the proper point.

The arm C is pivoted at such a point at the bottom that when the weight B descends the pulley G will crowd the arm to one side, and thus carry the rod D out of the way of the hammer after the first stroke. As it is necessary to make this part of the mechanism very sensitive, so as to be easily operated by the gong-hammer, the weight B will be made light, and will operate, when it falls, to release the heavier weight, which releases the horses. This may be done in various ways. In the present case I employ a bell-crank lever, I, pivoted near the bottom of the frame A, and which has a projecting pin, J, at one of its angles, against which the weight B strikes when it falls. This pulls the lever I forward, and a cord, K, attached to its opposite angle, and to the side of the long vertical lever L, will operate to draw this lever to one side. The lever L is pivoted at the top to one of the guides N, and has at its lower end a semicircular recess, M, similar to the recess in the lever C, before described. A block, O, is fitted to slide between the guides N, and a pulley or roller, P, is secured to its front similarly to the roller G. From the top of the slide O a cord, S, passes up over pulleys Q Q, and thence down to the weight R, which is heavy enough to operate the necessary detaching apparatus. This consists of as many cords as there are stalls. These cords extend along the ceiling and unite to a common cord, T, which connects with the bottom of the slide O, as shown.

The operation will be as follows: The gong-hammer, upon its first stroke, will strike the pad E and thus force the rod D and the arm or lever C back until the roller G is released from the recess F. This allows the weight B to fall, and at the same time crowd the lever C so far to one side as to carry the knob or pad E out of the way of the gong-hammer after the first stroke. The descent of the weight B causes it to strike the pin on the bell-crank lever I, and thus, through the cord K, the lever L will be pulled to one side and release the slide O, which allows the weight R to drop and pull the releasing-cords.

Various mechanical devices may be substituted for those herein described, as will be readily seen; but the principal point of novelty is the operating of these devices directly from the gong-hammer.

Having thus described my invention, what I claim, and desire to secure by Letters Patent, is—

1. The trip-rod D, arranged as described, and the oscillating lever C, for the purpose of releasing a suspended weight by the movement of a gong-hammer, substantially as and for the purpose described.

2. In combination with the rod D and the recessed oscillating lever C, pivoted as described, the weight B and its roller G, for the purpose of relieving friction, and removing the rod D from the action of the gong-hammer, substantially as herein described.

3. In combination with the weight B, caused to fall, as shown, the bell-crank lever I, cord K, and lever L, for releasing the slide O and weight R, and thus releasing the horses by means of the cord T, substantially as herein described.

4. The trip-rod D, oscillating lever C, and suspended weight B, in combination with the hammer of a gong, for the purpose of operating mechanism distant from the gong, substantially as above described.

ROBERT BRAGG.

Witnesses:
GEO. H. STRONG,
JNO. L. BOONE.